US005117484A

United States Patent [19]

Nakagawa et al.

[11] Patent Number: 5,117,484

[45] Date of Patent: May 26, 1992

[54] TERMINAL APPARATUS FOR VIDEOTEX SYSTEM

[75] Inventors: Yutaka Nakagawa; Ryoichi Suga; Hiroya Mochida, all of Kanagawa; Masashi Tonomura, Tokyo; Kazuhiko Shirai, Kanagawa, all of Japan

[73] Assignee: Sony Corporation, Tokyo, Japan

[21] Appl. No.: 305,616

[22] Filed: Feb. 3, 1989

Related U.S. Application Data

[62] Division of Ser. No. 838,529, Mar. 11, 1986, abandoned.

[30] Foreign Application Priority Data

Mar. 18, 1985 [JP] Japan ................................ 60-053876

[51] Int. Cl.[5] ................................................ G06F 13/00

[52] U.S. Cl. ............................. 395/100; 364/DIG. 2; 364/DIG. 1; 364/222.2; 364/237.2; 364/284

[58] Field of Search ... 364/200 MS File, 900 MS File; 358/160; 340/723

[56] References Cited

U.S. PATENT DOCUMENTS

| | | | |
|---|---|---|---|
| 4,432,009 | 2/1984 | Reitmeier et al. | 358/140 |
| 4,439,759 | 5/1984 | Fleming et al. | 340/703 |
| 4,439,761 | 5/1984 | Fleming et al. | 340/735 |
| 4,533,952 | 8/1985 | Norman, III | 358/160 |
| 4,626,837 | 12/1986 | Priestly | 340/723 |
| 4,739,402 | 4/1988 | Maeda et al. | 358/147 |

FOREIGN PATENT DOCUMENTS

0068619A1 1/1983 European Pat. Off. .

*Primary Examiner*—Thomas C. Lee
*Assistant Examiner*—Robert P. Harrell
*Attorney, Agent, or Firm*—Philip M. Shaw, Jr.

[57] ABSTRACT

When display data are written into the terminal's display memory, the data indicative of the display coordinate are converted from the normalized values to the absolute values of the NTSC system or PAL system and are then written into the corresponding addresses of the display memory, so that regardless of the fact that the display is of the NTSC system or of the PAL system, the figure can be displayed with the correct aspect ratio. Further, when the coordinates are converted, the conversion is carried out such that the display resolution is regarded as the highest one, so that even if the resolution of the display is increased by increasing the capacity of the display memory, it is not necessary to change the conversion algorithm. For displays having less than full resolution capability, the display data is scaled by omitting some of the converted data when writing it into the display memory.

6 Claims, 2 Drawing Sheets

TERMINAL APPARATUS FOR VIDEOTEX SYSTEM

CROSS-REFERENCES TO RELATED APPLICATION

This is a divisional of U.S. application Ser. No. 06-838,529, filed Mar. 11, 1986, now abandoned.

TECHNICAL FIELD

This invention relates to videotex systems, and more particularly, to a terminal apparatus for such a videotex system.

BACKGROUND ART

One type of a videotex display system is what is commonly referred to as the NAPLPS system. NAPLPS (North American Presentation Level Protocol Syntax), is a videotex standard in the United States based on TELIDON which is the Canadian standard. The NAPLPS protocol is published by the American National Standards Institute and the Canadian Standards Association. A detailed explanation can be found in the publication: "CSA T500-198x ANSI BSR x 3.110-198x, Sep. 9, 1983," by the American National Standards Institute and the Canadian Standards Association, at pages 11 to 17, beginning at line 11.

In the NAPLPS system, a graphical figure is transmitted and received by a method that is generally referred to as an alphageometric system. Specifically, all graphical figures are expressed by a combination of dots, lines, arcs, squares and polygons. From the transmission side, a code, generally referred to as a picture description instruction (PDI) code, is used to specify the type, position and size of the graphical figure to be transmitted. On the reception side, the PDI code is received and decoded to cause the terminal to generate sufficient dots and at the correct locations on its display screen to display the original graphical figure on a CRT display. A salient characteristic of the NAPLPS videotex system is that the conveyed display is terminal independent, i.e., the transmitter of the display message does not have to take into account the display resolution capability of the receiving terminal. A prior art terminal of this type is illustrated in U.S. Pat. No. 4,439,761 and U.S. Pat. No. 4,439,759.

When "a rising-sun flag" is drawn on the entire video display screen, for example, the necessary PDI code is defined as follows:

| PDI code | Meaning | Display | Drawing |
|---|---|---|---|
| RESET | Reset picture screen | Clear picture screen | |
| SET-COLOR white | Set color as white | Figure and character drawn hereinafter become white | |
| POINT SET 0/0 | Set current position at left-hand side corner (0,0) | | FIG. 6A |
| RECTANGLE-FILL 1,0.75 | Draw rectangle of 1 wide and 0.75 long, Paint out the inside | White rectangle is drawn on whole picture screen | FIG. 6B |
| SET-COLOR red | Set color as red | Figure and character will be drawn in red | |
| POINT SET 0.3,0.375 | Set current position | Center point on lefthand side of picture screen | FIG. 6C |
| ARC-FILL 0.7,0.375 0.3,0.375 | Draw arc (in this case, circle) and paint out the inside in red | Both ends of diameter are specified and circle is drawn | FIG. 6D |
| POINT SET 0.4,0.1 | Set current position | Under side on picture screen | |
| SI | Shift-in | Will be treated not as PDI but as character thereafter | |
| JAPAN | | character, JAPAN is drawn | FIG. 6E |
| SO | Shift-out | Returned to PDI | |

As just described in the above-mentioned description, the PDI code indicates the position and relative size of the graphical figure. The number of dots necessary to present this picture are a function of the resolution capacity of the terminal's display and are determined by the terminal's controller. The values which correspond to the PDI code are those of the normalized coordinates. These values are then shown on a video screen 1 of the CRT display 34, as best illustrated in FIG. 5.

In the NAPLPS system, the resolution of the display is determined by the resolution capability or normalization of a user's terminal apparatus. For example, even if the graphical figure is transmitted for a resolution of 4096 dots per line, which is the highest resolution available, a user's terminal apparatus must be of the same capability as that of the transmitter in order to display such a high resolution picture. If the user's terminal apparatus is capable of displaying only 256 dots, a low resolution picture is displayed by only displaying a fraction of these dots, e.g., only every 16th dot for a standard TV display. If the user's terminal apparatus, however, has a high resolution capability, the entire 4096 dots can be displayed.

A serious problem, however, is present in prior art systems. That problem is the incompatability of the NTSC and PAL systems; The NTSC system uses 525 scanning lines and the PAL system uses 625 scanning lines. As shown in FIG. 7A, if the video display screen of a CRT display utilizes the NTSC system, then there are 256 displayable dots in the horizontal direction and 200 displayable dots in the vertical direction. As shown in FIG. 7B, a video display screen utilizing the PAL system has 256 dots in the horizontal direction and 240 dots in the vertical direction.

Thus, if the PDI code is decoded without further processing, the display data will cause the graphical picture displayed on the CRT display to be compressed or expanded in the vertical direction depending on the type of system used.

SUMMARY OF THE INVENTION

It is a major object of the present invention to have a terminal apparatus, for example, a NAPLPS system, that can use a CRT display of either the NTSC system or the PAL system by carrying out a predetermined decoding for the PDI code and a predetermined mapping for the display system.

This is accomplished in the present invention by converting the normalized coordinate information for the pixel data into absolute coordinates corresponding to either an NTSC or PAL,.full resolution display and then storing the pixel data at addresses in a display memory corresponding to such absolute coordinates When the pixel data is thereafter read out from the display memory and displayed, it will have the correct position and aspect ratio for either the NTSC or PAL display screen. If the display screen is less than full resolution, this is compensated for by only storing a corresponding fraction of the pixel data in the display memory.

In the preferred embodiment this operation is carried out by a programmed central processing unit which is operatively connected to a buffer memory for storing received visual (i.e., pixel) information data in a normalized coordinate form, a display memory for storing visual information data in an absolute coordinate form and a visual display means for displaying the pixel data read out of the display memory.

Other objects, features, and advantages of the present invention will appear from the following detailed description of the best mode of the preferred embodiment, taken together with the accompanying drawings.

BEST MODE FOR CARRYING OUT THE INVENTION

Figure 1:
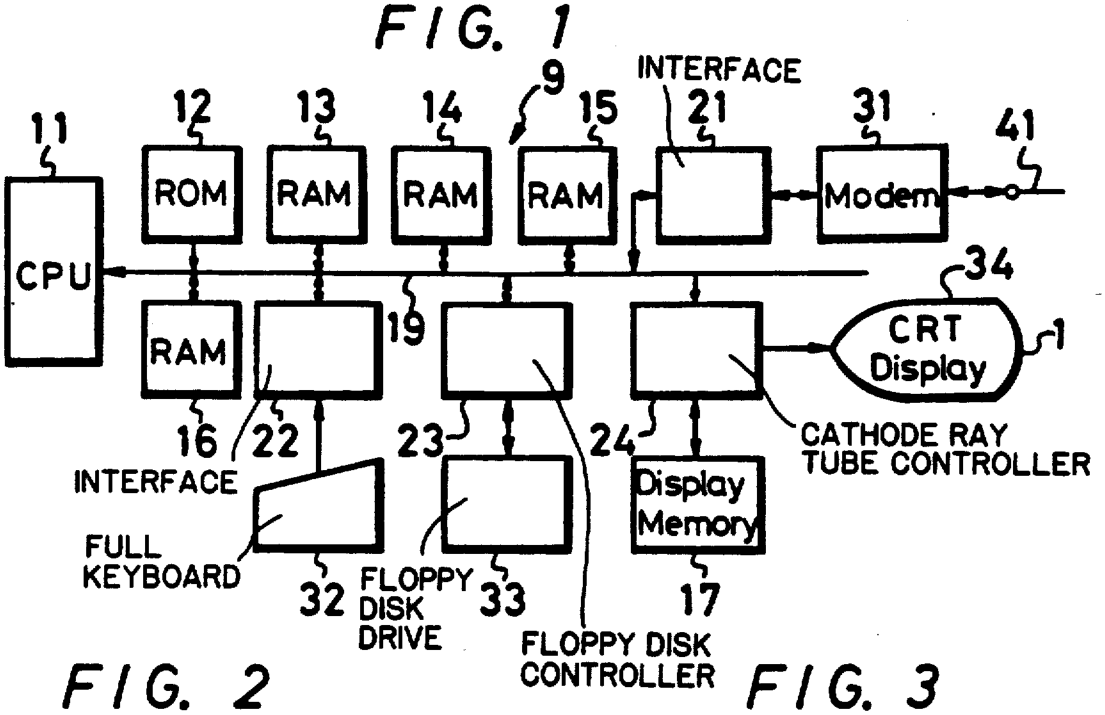
FIG. 1 is a block diagram of the terminal apparatus for videotex system of the present invention.

Referring to FIG. 1, there is shown a videotex system, designated 9. System 9 comprises a programmed, central processing unit (CPU) 11, a read-only memory (ROM) 12 and random-access memories (RAM's) 13-16. Memories 12-16 are connected to CPU 11 via a system bus 19. CPU 11 in the preferred embodiment is a 16-bit processing device. ROM 12 contains various written programs such as a program for CPU 11 to decode the PDI code that is transmitted to a conventional display. In addition, ROM 12 also stores other programs such as routines 50 and 60, which are illustrated as flow diagrams in FIGS. 2 and 3. As for RAM's 13-16, RAM 13 is the memory for a work area of CPU 11; RAM 14 is a page memory that can store the PDI codes of several pages; and RAM 15 is a buffer memory that is capable of accessing the PDI code in RAM 14, the display memory, etc. RAM 16, a C-MOS type memory in the preferred embodiment, is capable of storing data indicative of a mode of the user's terminal apparatus and other data qhwn the power of the user's terminal apparatus has been turned off.

In addition, system 9 comprises a modem 31 that is connected via an interface (I/F) 21 to system bus 19. Modem 31 is also connected via a telephone network line 41 to a videotex center or host computer, not shown. Further, a full keyboard (FKB) 32 is provided. Keyboard 32 is connected via an interface (I/F) 22 to system bus 19 such that input data from keyboard 32 is forwarded to CPU 11. System 9 also includes a floppy disk drive (FDD) 33. Floppy disk drive 33 is connected via a floppy disk controller (FDC) 23 to system bus 19, through which data are forwarded to a floppy disk, not shown.

Further, system 9 comprises a display memory 17. Display memory 17 in the preferred embodiment is a video RAM. Display memory 17 is connected via a cathode ray tube controller (CRTC) 24 to system bus 19. Controller 24 in turn is connected to a cathode ray tube (CRT) display 34.

In use, the display data, i.e., pixel data from CPU 11 is first written through controller 24 into a particular address of display memory 17. The particular address in display memory 17 is an address specified by CPU 11 and corresponds to a display position on the screen 1 of the display means 34. At the same time, the pixel data are read out from display memory 17, with its addresses synchronized with the vertical and horizontal scannings of display 34. This read-out is controlled by controller 24. The read-out pixel data are supplied to display 34, and then displayed thereon as a graphical picture.

Figure 4:
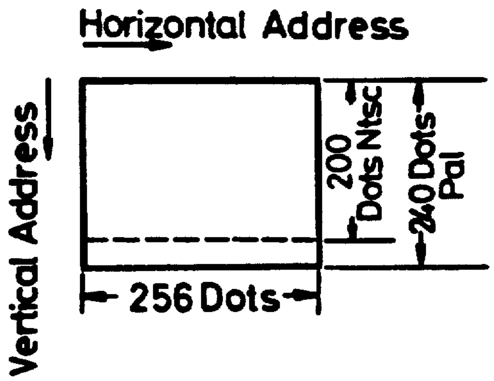
FIG. 4 is a display address map for the terminal apparatus of FIG., 1.
Figure 5:
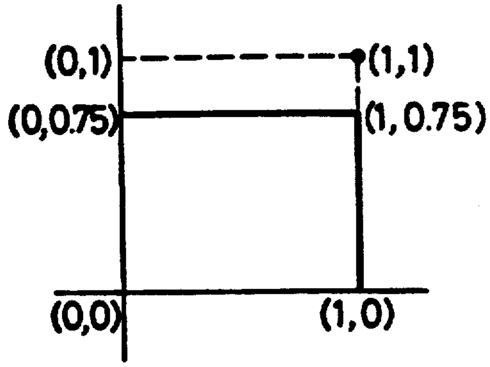
FIG. 5 is a coordinate diagram for the terminal apparatus of FIG. 1.

In the preferred embodiment, controller 24 can be operated either in the NTSC mode or the PAL mode, with the particular operational mode determined by CPU 11. As shown in FIG. 4, the total horizontal addresses stored in display memory 17 represent 256 dots and for the vertical addresses, 240 dots. If display 34 utilizes the NTSC system, only the first 200 dots of the vertical address are used. If the PAL system is used, all 240 dots of the vertical addresses are used. It should be understood that if the display 34 has a higher resolution capability, the memory 17 would preferably have correspondingly more addresses.

Figure 2:
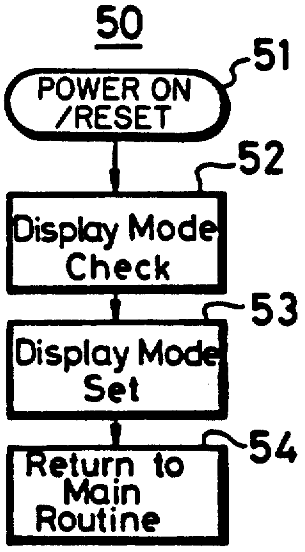
FIGS. 2-3 are flow diagrams illustrating the programming of the CPU for the terminal apparatus of FIG. 1.

When the power switch of the user's terminal apparatus is turned on or when the user's terminal apparatus has been reset, program routine 50 is executed by the CPU 11, as best shown in FIG. 2. In particular, when the power switch of the user's terminal apparatus is switched on or the user's terminal apparatus has been reset, routine 50 begins with step 51. At the next step 52, data indicative of the display mode, stored in RAM 16, is read out from RAM 16. These data indicate whether the display device was in the NTSC mode or the PAL mode when the user's terminal apparatus was last used. At next step 53, based on the determined result of step 52, data are supplied to controller 24, setting controller 24 to the mode that was used last. Accordingly, the user's terminal apparatus is now set to the previously used mode. This display mode can be changed by a key input from keyboard 32, and if the display mode is changed, data indicative of a new display mode are stored in RAM 16. Then, at step 54, the program routine goes to a main routine that is used for the user's terminal apparatus.

Figure 3:
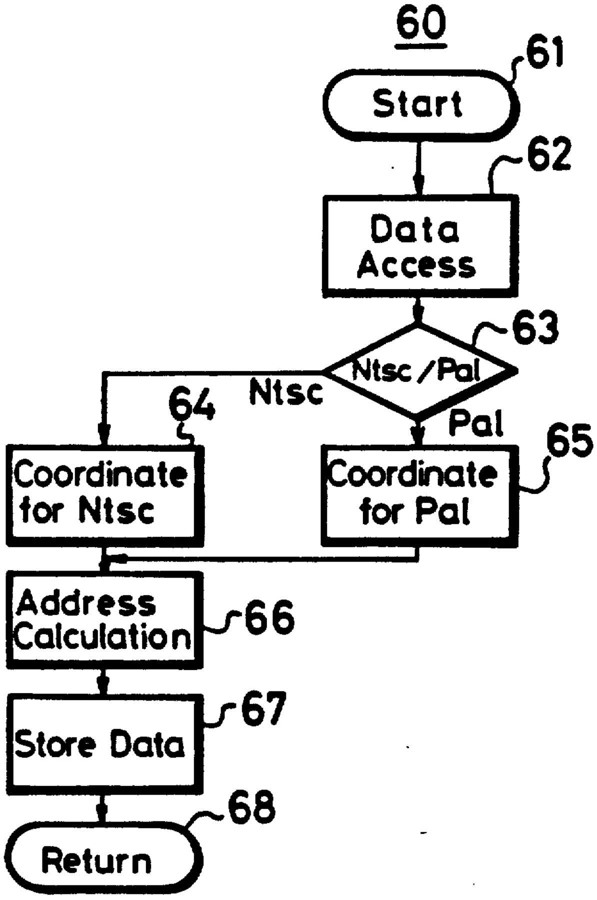

When the display data decoded from the PDI code are written into display memory 17, program routine 60 is executed by CPU 11, as best shown in FIG. 3. Program routine 60 begins with step 61 and the display mode data are read out from RAM 16 at step 62. At step 63, the above data are used to determine whether the display mode is either the NTSC mode or the PAL mode. If it is in the NTSC mode, the program routine goes to step 64. If it is in the PAL mode, the program routine goes to step 65.

Figure 6A:
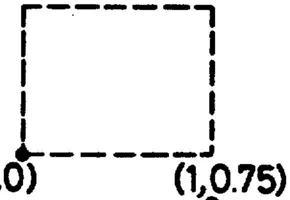
FIGS. 6A-6E illustrate the steps in forming a display on the terminal apparatus of FIG. 1.
Figure 6B:
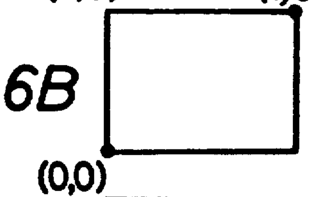
Figure 6C:
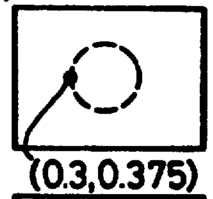
Figure 6D:
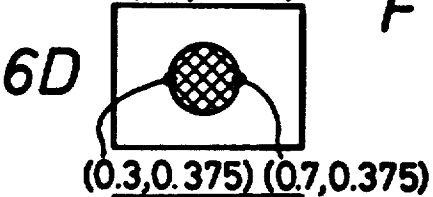
Figure 6E:
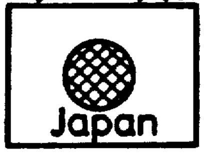
Figure 7A:
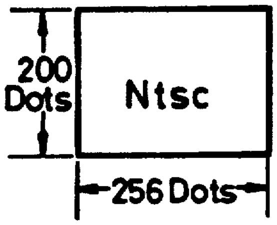
FIGS. 7A-7B illustrate the coordinates of the NTSC and PAL display modes.
Figure 7B:
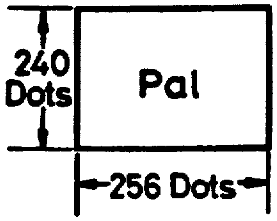

At step 64, the normalized, decoded data indicative of the display coordinate are converted to an absolute coordinate in the NTSC mode. In other words, as shown in FIG. 4, although the resolution as actually presented on the display 34 is 200 dots in the vertical direction and 256 dots in the horizontal direction when the system is in the NTSC mode, it is deemed for the purposes to be described as though it has 3200 dots in the vertical direction and 4096 dots in the horizontal direction to be compatible with the highest resolution requirements of the transmitted code. The coordinates are then converted from the normalized values to the absolute value. For instance, a vertical coordinate "0.5" (normalized value) is converted to "1600" (absolute value of 0.5×3200). Similarly, the coordinate of the dot in FIG. 6C would be (1230, 1200) (rounded off).

In a similar manner, at step 65, data indicative of the coordinates are converted to the absolute coordinate of the PAL mode. More specifically, although the resolution in the PAL mode is presented as 240 dots in the vertical direction and 256 dots in the horizontal direction, it is deemed to have 3840 dots in the vertical direction and 4096 dots in the horizontal direction for its highest resolution. The coordinates are then converted from the normalized values to the absolute values. For example, "0.5" in the vertical coordinate is converted to "1920" and the dot in FIG. 6C has the absolute value coordinates of (1230, 1440).

After either step 64 or step 65, the program routine goes to step 66. At step 66, the absolute coordinates that were converted at step 64 or 65 are written to corresponding addresses of display memory 17. For a full resolution NTSC display, the writing operation stores all the pixel data for the absolute value coordinates at the corresponding addresses in the display memory 17. If the display memory has less than full resolution, e.g., 1/16th of the full resolution in the case of a TV display, then only every 16th pixel data so converted is actually stored in the display memory 17. Program routine 60 ends with step 68.

Thereafter, data stored in display memory 17 are read out by controller 24 in the mode set by routine 50, and fed to display 34. Accordingly, regardless of the fact that CRT display 34 may be of either the NTSC system or the PAL system, the graphical figure is displayed with the correct aspect ratio.

To summarize the operation of the present invention, the addresses of the image data are transmitted from the center in the form of normalized coordinate values. These normalized coordinate values are converted into either absolute coordinate values of PAL or NTSC depending on the commands. In this case, the absolute value or coordinate means the maximum value for the display. For example, if the display has 4096×4096 dots, such as a plasma flat display having an aspect ratio of 1:1, the normalized value is converted on the basis of 4096×4096 displayable data dots. But if a CRT type display having a different aspect ratio is employed, some conversion is necessary for correcting image distortion due to aspect ratio. Further in the case of a raster scan display, the number of horizontal scan lines should be also considered. For example, a raster scan display generally used in an expensive computer graphics system has more horizontal scan lines than a TV display. In this case, the normalized value of the address is converted on the basis of 1024×1000 displayable dots.

In the case of the preferred embodiment, a TV display is used as the display device. A TV display has a display faculty of 256×200 dots for NTSC and 240×256 dots for PAL. After the absolute (maximum) value data for either PAL or NTSC are obtained in consideration of the number of lines and aspect ratio of the display in order to avoid image distortion, as described above, the data are transferred by simple thinning out processing. Namely, only every 16th data are transferred to the memory 17 relating to X address and Y address. This is done under the control of the CPU 11.

According to the present invention, as set forth above, when the display data are written into display memory 17, the data indicative of the coordinate are converted from the normalized value to the absolute value of either the NTSC system or PAL system. Since the address of display memory 17 contains coordinate data in an absolute value format, the display data may be displayed in display 34 regardless of its mode. Whether display 34 is in the NTSC system or the PAL system, the graphical figure displayed has the correct aspect ratio. Further, when the coordinate is converted, the conversion is carried out such that the resolution is regarded as the highest one, so that even when the resolution of the display is increased by increasing the capacity of display memory 17, the algorithm of routine 60 need not be changed.

It will be apparent to those skilled in the art that various modifications may be made within the spirit of the invention and the scope of the appended claims.

What is claimed is:

1. An image information accessing terminal for accessing image information signals supplied by a remote data center, comprising:

input/output interface means for coupling the terminal to the data canter;

buffer memory means connected to the input/output interface means for storing the image information signals;

display control means, including a display memory, for selectively generating, in response to the stored image information signal, an output video signal which corresponds to the image information signal, but which is in a display form selected from a plurality of television display standards and storing the output video signal in the display memory; and operator programmable control processor means connected to the buffer memory means and the display control means for controlling their operation and for supplying the control signal to the display control means.

2. An image information accessing terminal as recited in claim 1, wherein the display control means generates display dot data corresponding to the image information signals stored in the buffer memory and further wherein the display control means stores the corresponding output video signal at a store address in the display memory which store address is determined according to the standard selected by the control processor means.

3. An image information accessing terminal as recited in claim 2, wherein the image information signals include normalized address information and further wherein the display control means, before storing the corresponding output video signal in the display memory, converts the normalized address information into absolute address information of the selected standard.

4. An image information accessing terminal as recited in claim 3, wherein the display control means converts the absolute address information into real address information depending on the size of the display memory by storing only a predetermined fraction of the absolute address information.

5. An image information accessing terminal as recited in claim 1 wherein the image information signals include picture description instruction codes according to the North American Presentation level Protocol Syntax.

6. An image information accessing terminal as recited in claim 1 further comprising means for storing data indicative of a display form selected from a plurality of television display standards and wherein the operator programmable control processor means is further responsive to such stored display form indicative data when the operator programmable control processor causes the display control means to generate the display dot data and store it in the display memory.

* * * * *